(12) United States Patent
Hiller

(10) Patent No.: US 10,911,156 B1
(45) Date of Patent: Feb. 2, 2021

(54) OPTICAL COMMUNICATIONS MONITORING APPARATUS, METHODS, AND SYSTEMS

(71) Applicant: The Boeing Company, Chicago, IL (US)

(72) Inventor: Nathan D. Hiller, Irvine, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/722,785

(22) Filed: Dec. 20, 2019

(51) Int. Cl.
*H04B 10/08* (2006.01)
*H04B 10/67* (2013.01)
*H04B 10/079* (2013.01)

(52) U.S. Cl.
CPC ..... *H04B 10/675* (2013.01); *H04B 10/07955* (2013.01)

(58) Field of Classification Search
CPC .......... H04B 10/07955; H04B 10/0775; H04B 10/07953; H04B 10/0795; H04B 10/0793; H04J 14/02; H04J 14/0221; H04J 14/0202
USPC ........ 398/33, 38, 34, 25, 26, 27, 79, 45, 48, 398/49, 84, 85, 87, 158, 159; 385/24, 37, 385/16, 17, 18
See application file for complete search history.

(56) References Cited

U.S. PATENT DOCUMENTS

| | | | |
|---|---|---|---|
| 5,303,078 A | 4/1994 | Brackett et al. | |
| 6,834,144 B2 | 12/2004 | Belmonte et al. | |
| 7,405,855 B2 | 7/2008 | Riant et al. | |
| 7,499,182 B2 | 3/2009 | Zeng et al. | |
| 7,505,137 B2 | 3/2009 | O'Gorman et al. | |
| 7,899,330 B2 | 3/2011 | Ye et al. | |
| 8,699,024 B2 | 4/2014 | Colbourne et al. | |
| 9,857,468 B1 | 1/2018 | Eichenholz et al. | |
| 9,948,389 B2 | 4/2018 | D'Errico et al. | |
| 10,211,593 B1 | 2/2019 | Lingvay et al. | |
| 2004/0096212 A1* | 5/2004 | McLeod | H04B 10/0795 398/25 |
| 2005/0105902 A1* | 5/2005 | Alavie | H04B 10/077 398/34 |
| 2006/0013585 A1* | 1/2006 | Hnatiw | G01J 3/28 398/38 |
| 2014/0233960 A1* | 8/2014 | Peach | H04B 10/1129 398/119 |

FOREIGN PATENT DOCUMENTS

WO 2016110604 A1 7/2016

* cited by examiner

*Primary Examiner* — Hanh Phan
(74) *Attorney, Agent, or Firm* — Armstrong Teasdale LLP

(57) ABSTRACT

A device for increasing a number of optical signal channels detectable by an optical channel performance monitor having M detectors includes an input to receive an optical signal, a filter assembly coupled to the input, a controller connected to the filter assembly, and an output. The controller selectively configures the filter assembly to filter the optical signal in a repeating sequence of periodic passbands. The output transfers an output of the filter assembly to an optical channel performance monitor.

29 Claims, 4 Drawing Sheets

OPTICAL COMMUNICATIONS MONITORING APPARATUS, METHODS, AND SYSTEMS

FIELD

The field relates generally to optical communications and, more specifically, to optical performance monitoring systems and devices for increasing a number of optical signal channels detectable by an optical channel performance monitor.

BACKGROUND

Optical communications systems transmit information using optical signals. The signals may be transmitted through a waveguide, such as a fiber-optic cable, through a liquid, or through free space. Transmission through free space includes transmission through the air, through a vacuum, through a near vacuum, and the like.

In at least some optical communication systems, a plurality of channels of communication are transmitted at the same time on a single communication path (e.g., a single fiber-optic cable). For example, in Dense Wavelength Division Multiplexing (DWDM), multiple signals are combined and transmitted simultaneously at different wavelengths on the same communication path.

Optical channel power monitors (OCPM) are a non-invasive channel monitoring device that receives a small fraction (e.g., 1%) of an optical communication signal (without interrupting the original signal transmission) and monitors the quality of the signal. For example, an OCPM may track which available channels are being used (that is, which channels are currently carrying a signal), the power of the signal in each channel, the wavelength of the signals, and the optical signal to noise ratio (OSNR).

OCPMs typically are configured to monitor a fixed number of channels each having a specific bandwidth. A high resolution OCPM is typically configured to simultaneously, separately monitor each channel in an optical signal. Lower resolution OCPMs may have too broad of a channel bandwidth to detect and monitor each channel individually. That is, lower resolution OCPMs may have such a broad bandwidth for each detector that multiple adjacent channels of a signal are captured by each detector. As a simplified explanatory example, if an optical signal includes twelve channels each having a bandwidth of fifty nanometers, a high resolution OCPM for that signal would include twelve detectors, each for detecting a different fifty nanometer bandwidth of the signal. Thus, each channel would be detected by a different detector of the OCPM. In contrast, a low resolution OCPM might only include four detectors, each a different one hundred and fifty nanometers of the signal. Thus, each detector would detect three channels of the signal. Therefore, a lower resolution OCPM may be unable to perform suitable monitoring on an individual channel basis. However, as the number of channels increases and/or the bandwidth of each channel narrows (to increases the resolution of the OCPM), the complexity and cost of the OCPM generally increases as compared to lower resolution OCPMs.

BRIEF DESCRIPTION

One aspect is a device for increasing a number of optical signal channels detectable by an optical channel performance monitor having M detectors, where M is an integer greater than 1. The device includes an input to receive an optical signal, a filter assembly coupled to the input to receive the optical signal, a controller connected to the filter assembly, and an output. The controller selectively configures the filter assembly to filter the optical signal in a repeating sequence of periodic passbands. The output transfers an output of the filter assembly to an optical channel performance monitor.

Another aspect is an optical channel performance monitoring system. The system includes an optical channel performance monitor, and a device. The optical channel performance monitor has an input and M detectors, where M is an integer greater than 1. The device includes an input to receive an optical signal, a filter assembly coupled to the input to receive the optical signal, a controller connected to the filter assembly, and an output. The controller selectively configures the filter assembly to filter the optical signal in a repeating sequence of periodic passbands. The output is coupled to the input of the optical channel performance monitor to transfer an output of the filter assembly to the optical channel performance monitor.

Another aspect is a method of optical channel performance monitoring. The method includes receiving an optical signal from a channel, transferring the optical signal to a filter assembly, configuring the filter assembly to have a first plurality of periodic passbands, transferring a first output of the filter assembly having the first plurality of periodic passbands to an optical channel performance monitor, configuring the filter assembly to have a second plurality of periodic passbands different than the first plurality of periodic passbands, and transferring a second output of the filter assembly having the second plurality of periodic passbands to the optical channel performance monitor.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

Although specific features of various examples may be shown in some drawings and not in others, this is for convenience only. Any feature of any drawing may be referenced and/or claimed in combination with any feature of any other drawing.

Unless otherwise indicated, the drawings provided herein are meant to illustrate features of examples of the disclosure. These features are believed to be applicable in a wide variety of systems comprising one or more examples of the disclosure. As such, the drawings are not meant to include all conventional features known by those of ordinary skill in the art to be required for the practice of the examples disclosed herein.

DETAILED DESCRIPTION

Figure 1:
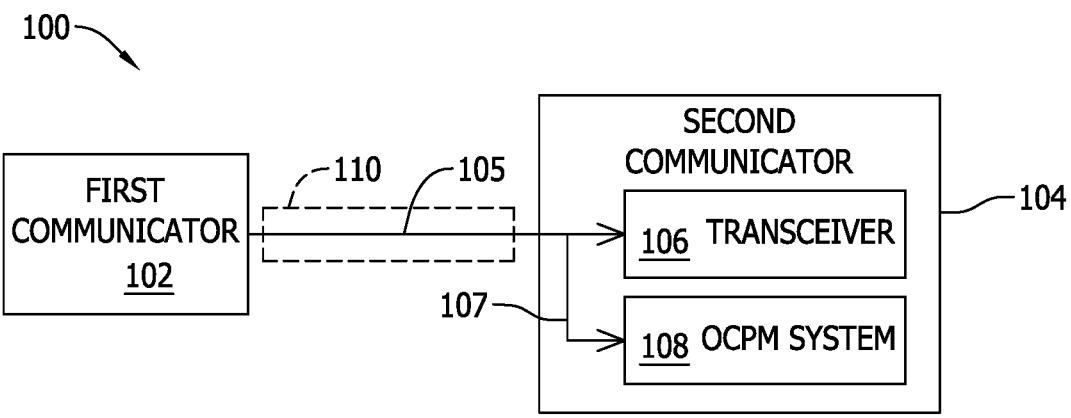
FIG. 1 is a block diagram of an optical communication environment including an optical communication performance monitoring (OCPM) system.

Referring particularly to the drawings, FIG. 1 is a block diagram of an optical communication environment 100. A first communicator 102 and a second communicator 104 are located within the optical communication environment 100. The first communicator 102 and the second communicator 104 may be mobile or stationary devices, such as a spacecraft, an aircraft, a satellite, a ship, a truck, a building, a ground communication station, and the like.

The first communicator 102 transmits an optical signal 105 to the second communicator. The optical signal 105 is transmitted through a channel 110. The channel 110 is any type of channel capable of transmitting an optical signal. In an example, the channel 110 is free space, such as a vacuum, a near-vacuum, interplanetary space, and the like. Alternatively, the channel 110 may be a conduit, atmospheric air, water, or a waveguide (such as an optical fiber or a planar waveguide). Moreover, the channel 110 may be a combination of more than one channel 110, including more than one type of channel.

The second communicator 104 includes an optical communication transceiver 106 that receives the optical signal 105. A portion of the optical signal is diverted to an optical channel performance monitoring (OCPM) system 108. The portion is referred to as the received optical signal 107 of the OCPM system 108.

Figure 2:
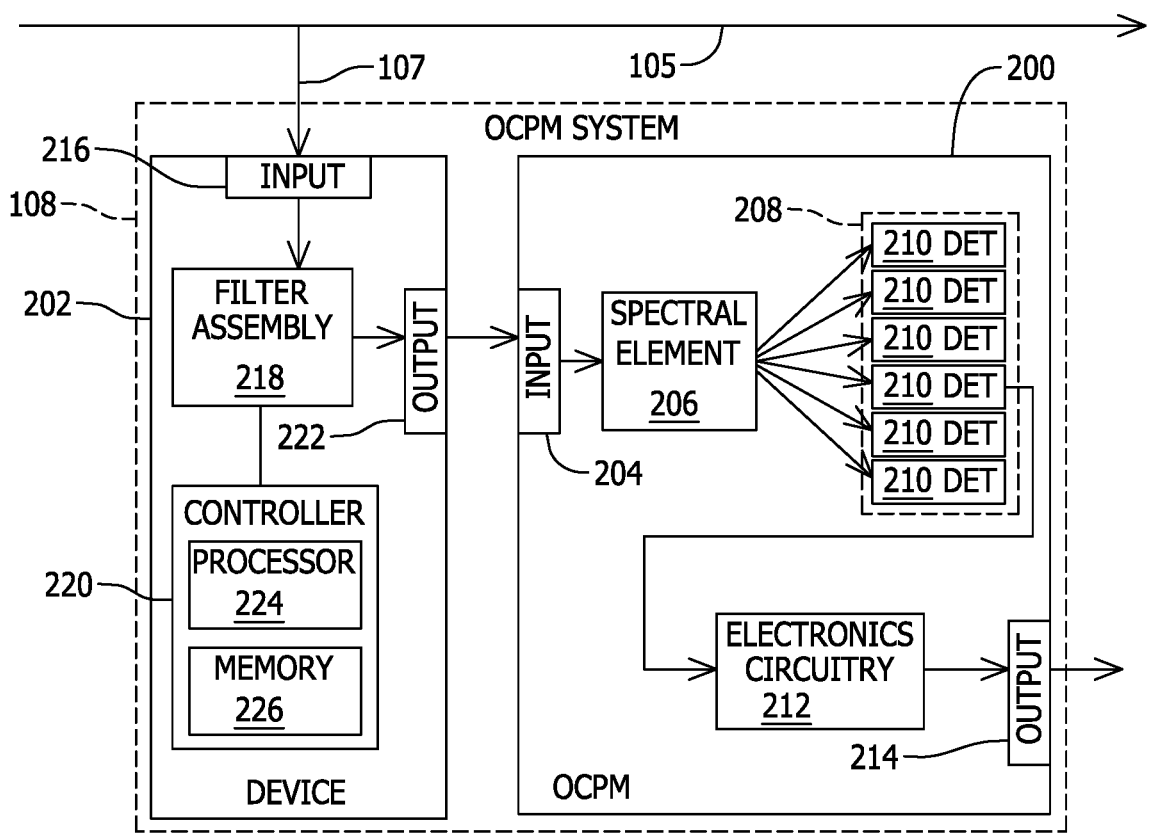
FIG. 2 is a diagram of an example implementation of the OCPM system in FIG. 1.

FIG. 2 is a diagram of an example implementation of the OCPM system 108. The OCPM system 108 includes an OCPM 200 and a device 202 for increasing the resolution of the OCPM 200.

The OCPM 200 includes an input 204, a spectral element 206, a detector array 208 including multiple detectors 210 (labelled "DET" in FIG. 2), electronics circuitry 212, and an output 214. The input 204 receives an optical signal, such as an output of the device 202 (described below). The received optical signal is directed to the spectral element 206, such as a diffraction grating, that separates the received optical signal into multiple signals, each of which has a bandwidth centered on a different frequency. The spectral element 206 separates the received signal into the same number of signals as the number of detectors 210. Each detector 210 of the detector array 208 detects its portion of the received signal and outputs the detection result to the electronics circuitry for processing. Although the detectors 210 are described herein as multiple, discrete detectors, the detector array 208 may be a single detector operable to detect multiple signals at a given resolution, with each of the bandwidths of detection being considered a detector 210. The processed results are output from the OCPM through the output 214 to a remote device, such as a host computer, a remote server, or the like, for use in monitoring the performance of the optical communication between the first communicator 102 and the second communicator 104.

If the signal received by the OCPM 200 has the same number of channels as the number of detectors 210 in the detector array 208, each detector 210 will detect the signal from one channel in the received signal. However, if the signal received by the OCPM 200 has more channels than the OCPM 200 has detectors 210, each detector will detect multiple channels.

The device 202 operates to attempt to prevent the detectors 210 detecting more than one channel at a time by providing a signal to the OCPM 200 that has the same or fewer number of channels as the number of detectors 210, even when the received optical signal 107 includes more channels than the number of detectors. That is, the device 202 operates to increase the resolution of the OCPM 200.

The device 202 includes an input 216, a filter assembly 218, a controller 220, and an output 222. The input receives the optical signal 107 and provides the optical signal 107 to the filter assembly 218. The controller 220 selectively configures the filter assembly 218 to filter the optical signal 107 in a repeating sequence of periodic passbands. That is, the filter assembly 218 is configured by the controller 220 to permit periodic narrow (relative to the overall bandwidth of the optical signal 107) bands of frequencies to pass and to substantially block all other frequencies. Thus, a periodic group of channels of the optical signal 107 are permitted to pass at one time and are output from output 222 to the OCPM 200. In the example, the number of passbands is equal to the number of detectors 210. Alternatively, the number of passbands may be less than the number of detectors 210. Subsequently, the controller 220 configures the filter assembly 218 for a second group of periodic passbands different than the first group. The second group of periodic passbands has the same periodicity as the first group, but is shifted from the first group by approximately the width of one of the passbands. This filtering with different, shifted periodic passbands continues until all channels in the optical signal 107 have been allowed to pass from the filter assembly 218 to be output to the OCPM 200. The cycle then repeats, typically starting again with the first group of periodic passbands.

The controller 220 may include any suitable combination of analog and/or digital controllers capable of performing as described herein. In the example, the controller 220 includes a processor 224 and a memory 226. The processor 224 is coupled to memory 226 for executing programmed instructions. The processor 224 may include one or more processing units (e.g., in a multi-core configuration). The controller 220 is programmable to perform one or more operations described herein by programming the memory 226 and/or the processor 224. For example, the processor 224 may be programmed by encoding an operation as one or more executable instructions and providing the executable instructions in the memory 226.

The processor 224 may include, but is not limited to, a general purpose central processing unit (CPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by the processor 224, cause the processor 224 to perform at least a portion of the methods described herein. The above examples are not intended to limit in any way the definition and/or meaning of the term processor.

The memory 226, as described herein, is one or more devices that enable information such as executable instructions and/or other data to be stored and retrieved. The memory 226 may include one or more computer-readable media, such as, without limitation, dynamic random access memory (DRAM), static random access memory (SRAM), a solid state disk, a hard disk, and/or any other suitable type of memory. The memory 226 may be configured to store any instructions or any type of data suitable for use with the methods and systems described herein.

Figure 3A:
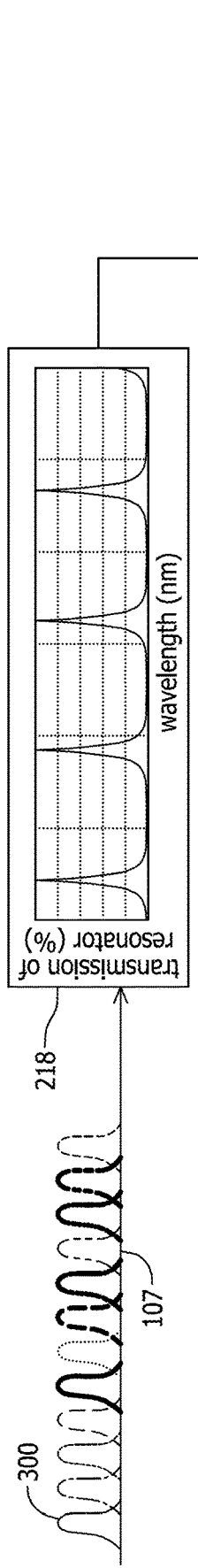
FIG. 3A is a first configuration of a filter assembly by a controller in the OCPM system of FIG. 2.
Figure 3B:
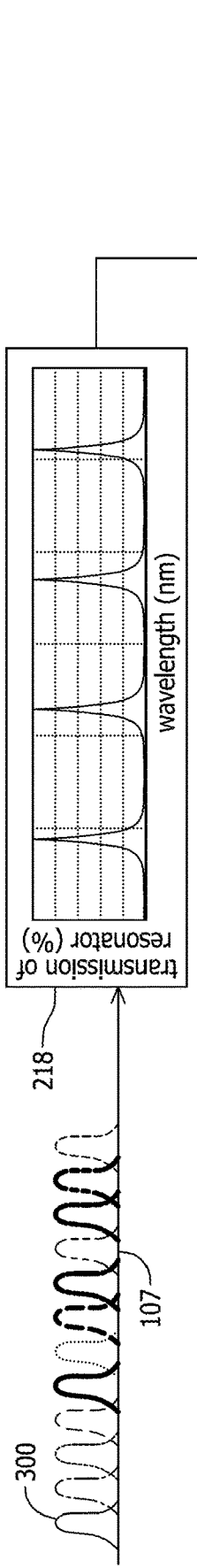
FIG. 3B is a second configuration of a filter assembly by a controller in the OCPM system of FIG. 2.
Figure 3C:
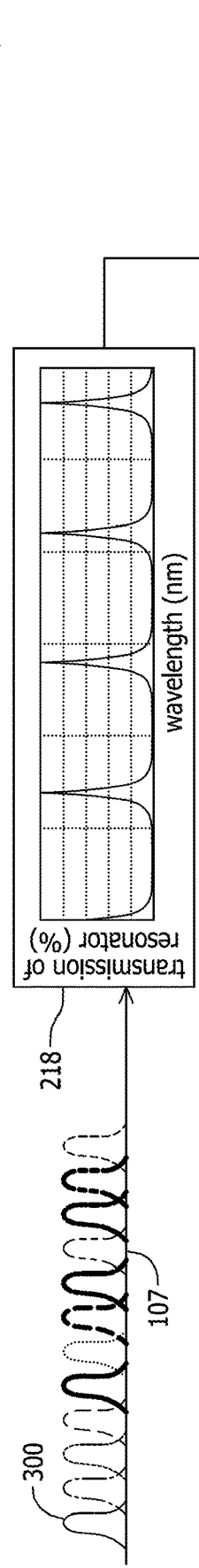
FIG. 3C is a third configuration of a filter assembly by a controller in the OCPM system of FIG. 2.

The process of configuring the filter assembly 218 for a repeating sequence of periodic passbands will be further explained with reference to FIGS. 3A-3C. FIGS. 3A-3C illustrate a sequence of three configurations of the filter assembly 218 by the controller 220. In this example, the optical signal 107 includes twelve channels 300. For this example, the OCPM 200 includes four detectors 210. In FIG. 3A, at a time t(1), the controller has configured to filter assembly 218 with a first group of four periodic passbands. Each passband has a bandwidth of about the bandwidth of one channel of the optical signal 107. When the received optical signal 107 is filtered by the filter assembly 218, four channels of the optical signal 107 are output. That is passed channels 302, which correspond to the frequencies in the passbands, are output, while the signals in the suppressed channels 304, which do not correspond to the frequencies in the passbands, are suppressed. In particular, the first, fourth, seventh, and tenth channels are passed channels 302, and the remainder are suppressed channels 304. At a time t(2) after time t(1), in FIG. 3B, the controller reconfigures the filter assembly 218 with a second group of four periodic passbands. The second group of passbands has a same period as the first group, but is shifted in frequency from the first group by about the width of one passband (which is substantially the bandwidth of one channel). When the received optical signal 107 is filtered by the filter assembly 218 configured with the second group of passbands, four different channels 300 of the optical signal 107 are output as passed channels 302, while the remaining channels 300 are suppressed channels 304. In particular, the second, fifth, eighth, and eleventh channels are passed channels 302, and the remainder are suppressed channels 304. Finally, at time t(3) after time t(2), in FIG. 3C, the controller reconfigures the filter assembly 218 with a third group of four periodic passbands. The third group of passbands has a same period as the first and second group, but is shifted in frequency from the second group by about the width of one passband (which is substantially the bandwidth of one channel). When the received optical signal 107 is filtered by the filter assembly 218 configured with the third group of passbands, four different channels 300 of the optical signal 107 are output as passed channels 302, while the remaining channels 300 are suppressed channels 304. In particular, the third, sixth, ninth, and twelfth channels are passed channels 302, and the remainder are suppressed channels 304. This sequence of configurations from 3A through 3C may then be repeated.

As can be seen, at any given time, such as at time t(1) in FIG. 3A, only four channels 300 of the received optical signal 107 are output as passed channels 302 to the OCPM 200. Thus, the OCPM 200, which in this example only includes four detectors 210 in this example, can use one detector for each of the four passed channels 302 and each detector can detect only one channel. Over the course of one cycle from FIG. 3A-FIG. 3C, each of the channels 300 may be individually detected by the detectors 210 of the detector array. Without the device 202, either only four channels 300 would be detected (if the bandwidth of each detector 210 is equal to the bandwidth of each channel 300) or each detector would simultaneously detect more than one channel 300 (e.g., three channels per detector 210). In either case, a complete and accurate picture of the condition of the optical signal 107 would not be captured. The length of time for each configuration from FIG. 3A to FIG. 3C may be adjusted depending on the timescale of events of interest. That is, the time in each configuration should be long enough to capture a signal from each channel, and short enough that each channel 300 is detected at least once within the timescale of the event(s) of interest for which the optical signal 107 is being monitored.

The specific techniques used by the controller 220 to configure the filter assembly 218 to filter the optical signal in a repeating sequence of periodic passbands varies among different implementations of the device 202 and the filter assembly 218. Broadly, the filter assembly 218 may include a dynamic optical filter or multiple static optical filters. A dynamic optical filter can be dynamically adjusted by the controller to change the frequencies that it allows to pass and the frequencies that it blocks. For example, the dynamic optical filter may be an acousto-optic tunable filter, which is a periodic, narrow-band filter that can be rapidly tuned by the controller 220 by varying the frequency at which an optical fiber carrying the optical signal 107 is vibrated. Static optical filters are configured to have fixed periodic passbands that are not changed or modified. Example suitable static optical filters for use in the filter assembly 218 include a Fabry-Perot filter (Etalon), a Bragg grating filter, a ring resonator, a diffraction grating, and a waveguide grating router. Moreover, the optical filters may be categorized as waveguide optical filters and free space optical filters. For example a fiber optic acousto-optic tunable filter is light propagating in an optical fiber that is vibrated like a guitar string, so this would be categorized as a waveguide optical filter. In contrast, diffraction grating works by a free space optical beam impinging and scattering/diffracting from a textured surface, so this would be categorized as a free space optical filter.

Figure 4:
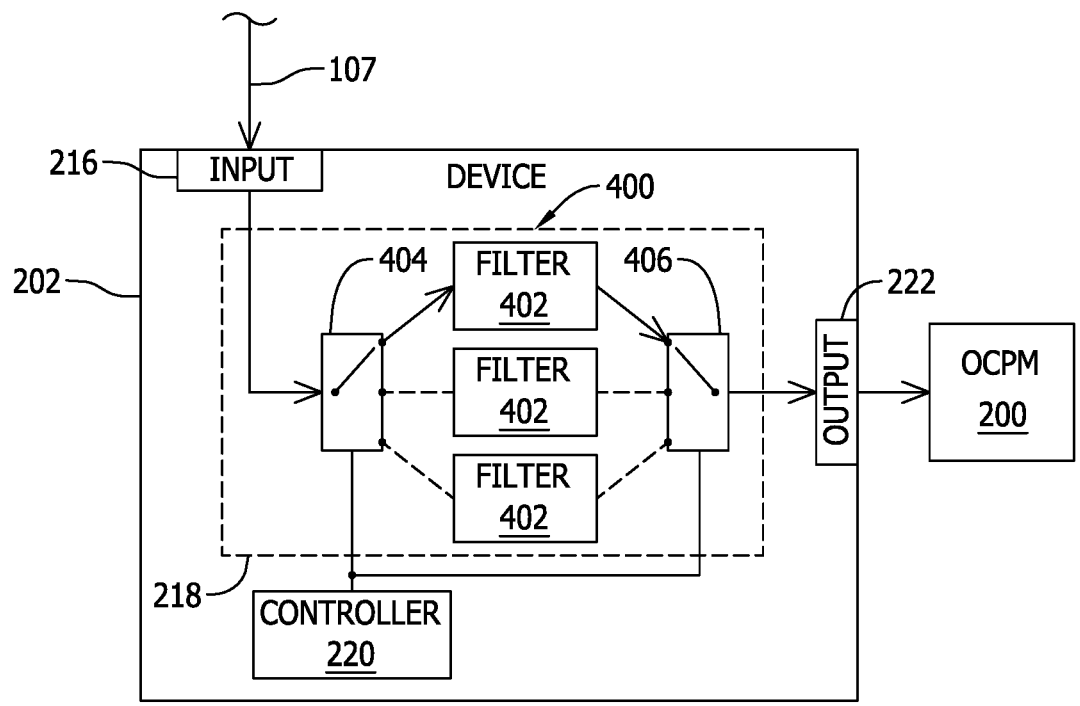
FIG. 4 is a block diagram of an example implementation of the device of the OCPM system of FIG. 2 using multiple static filters in the filter assembly.

FIG. 4 is a block diagram of an example implementation of the device 202 using multiple static filters in the filter assembly 218. Specifically, the implementation of the device 202 in FIG. 4 includes a bank of filters 400. The bank of filters 400 includes multiple periodic optical filters 402 (labelled "FILTER" in FIG. 4) and an optical switch 404. Each periodic optical filter 402 is a static filter including a plurality of passbands different from each other periodic optical filter 402. For example, each periodic optical filter 402 may be a filter having the response of a different one of the filter assembly 218 configurations in FIGS. 3A, 3B, and 3C. The optical switch 404 is coupled between the input 216 and the bank of filters 400. The optical switch 404 is selectively operably by the controller 220 to transfer the received optical signal 107 to different ones of the optical filters 402 in the bank of filters 400. In the example implementation, an output optical switch 406 is coupled between the bank of filters 400 and the output 222. The output optical switch 406 is selectively operably by the controller 220 to transfer the filtered output of different ones of the optical filters 402 in the bank of filters 400 to the output 222. In alternatives implementations the outputs of all of the filters 402 are always connected to the output 222 without use of the output optical switch 406 or are connected by any other suitable constant or selectable connector. To configure the filter assembly 218 to filter the optical signal 107 in a repeating sequence of periodic passbands (again with reference to the example in FIGS. 3A-3C), the controller 220 connects the optical switches 404 and 406 to the uppermost filter 402 in FIG. 4 at time t(1), connects the optical switches 404 and 406 to the middle optical filter 402 in FIG. 4 at time t(2), and connects the optical switches 404 and 406 to the lowermost optical filter 402 in FIG. 4 at time t(3). This sequence of connections is then repeated by the controller 220.

The number of filters 402 included in the bank of filters 400 may be determined by the number of detectors 210 and the number of channels in the optical signal 107. If the optical signal 107 includes N channels, the OCPM 200 includes M detectors 210, and N is greater than M, the minimum number ("X") of filters 402 needed in the bank of filters 400 is N/M. Moreover, each filter of these X optical filters 402 may include M passbands, so that each filter 402 passes the same number of channels as the OCPM 200 has detectors 210. Of course, more than X optical filters 402 may be used, either with M passbands or with fewer than M passbands. In the example of FIGS. 3A-3C, the optical signal 107 included twelve channels (N=12), and the OCPM 200 included four detectors 210 (M=4). Thus, X=12/4=3, and three filters 402 with four passbands each are needed and used.

Figure 5:
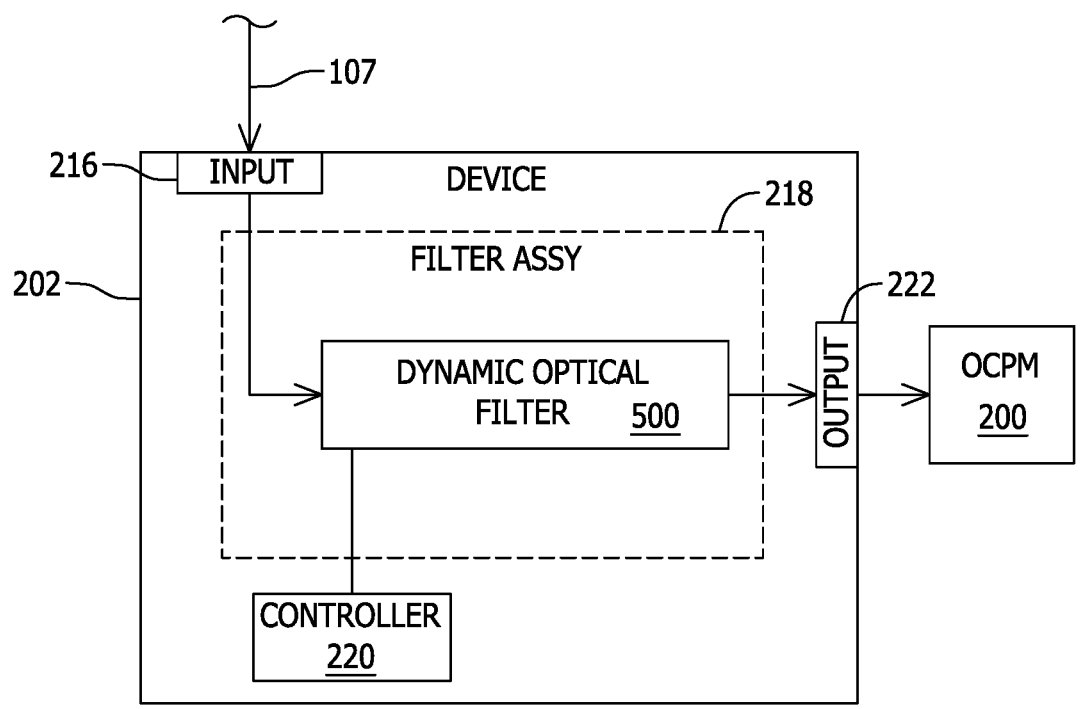
FIG. 5 is a block diagram of an example implementation of the device using a dynamic filter in the filter assembly.

FIG. 5 is a block diagram of an example implementation of the device 202 using a dynamic optical filter 500 in the filter assembly 218. As discussed above, a dynamic filter is reconfigurable to provide different periodic passbands. Thus, in this implementation, only a single filter (i.e., the dynamic optical filter 500) is needed, rather than multiple static filters as are used in the implementation of FIG. 4. The controller 220 sequentially reconfigures the dynamic optical filter 500 through a series of configurations, with each configuration having a different plurality of periodic passbands. For example, the controller 220 may configure the dynamic optical filter 500 to sequentially have the responses of the filter assembly 218 configurations in FIGS. 3A, 3B, and 3C at times t(1), t(2), and t(3), and then repeat the sequence.

Similar to the implementation of FIG. 4, in the implementation of FIG. 5, the number of configurations of the dynamic optical filter 500 may be determined by the number of detectors 210 and the number of channels in the optical signal 107. If the optical signal 107 includes N channels, the OCPM 200 includes M detectors 210, and N is greater than M, the minimum number ("X") of configurations of the dynamic optical filter 500 needed is N/M. Moreover, each configuration may include M passbands, so that each configuration passes the same number of channels as the OCPM 200 has detectors 210. Of course, more than X configurations may be used, either with M passbands or with fewer than M passbands. In the example of FIGS. 3A-3C, the optical signal 107 included twelve channels (N=12), and the OCPM 200 included four detectors 210 (M=4). Thus, X=12/4=3, and three configurations of the dynamic optical filter 500 with four passbands each are needed and used.

Figure 6:
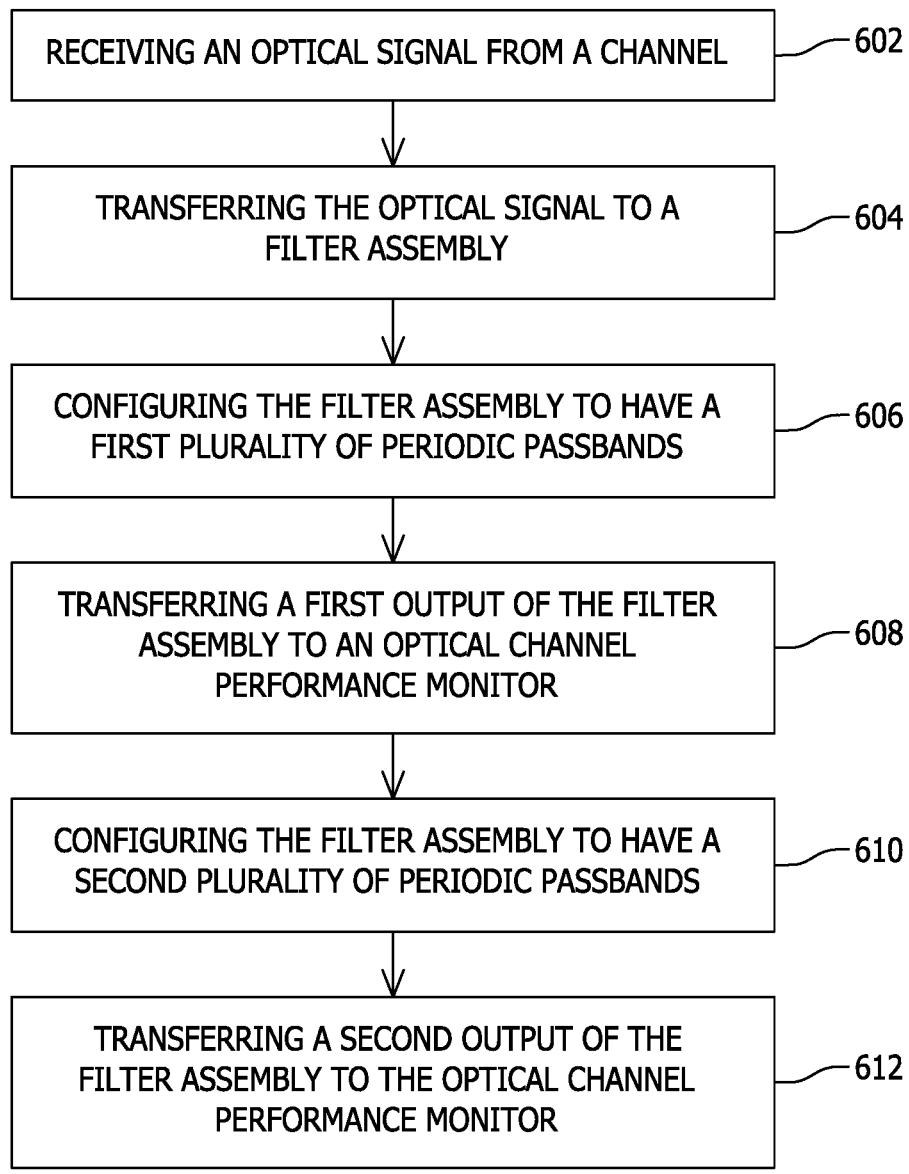
FIG. 6 is a flow diagram of an example method of optical channel performance monitoring.

FIG. 6 is a flow diagram of a method 600 of optical performance monitoring. The method may be performed by the device 202 or by any other suitable device. At 602, the method includes receiving an optical signal from a channel. The optical signal is transferred 604 to a filter assembly.

At 606, the filter assembly is configured to have a first plurality of periodic passbands. For example, in the implementation of FIG. 4, the controller 220 configures the filter assembly 218 to have a first plurality of periodic passbands by connecting the optical switch 404 to the uppermost optical filter 402, which is a static filter having the first plurality of periodic passbands. In the implementation of FIG. 5, the controller 220 configures the filter assembly 218 to have a first plurality of periodic passbands by controlling the dynamic optical filter 500 to have the first plurality of periodic passbands.

A first output of the filter assembly having the first plurality of periodic passbands is transferred to an optical channel performance monitor at 608. For example, in the implementation of FIG. 4, the output of the uppermost optical filter 402 is coupled to the output 222 through the output optical switch 406 under the control of the controller 220. In the implementation of FIG. 5, the output of the dynamic optical filter 500 is directly connected to the output 222.

The filter assembly is then configured at 610 to have a second plurality of periodic passbands different than the first plurality of periodic passbands. For example, in the implementation of FIG. 4, the controller 220 configures the filter assembly 218 to have a second plurality of periodic passbands by connecting the optical switch 404 to the middle optical filter 402, which is a static filter having the second plurality of periodic passbands. In the implementation of FIG. 5, the controller 220 configures the filter assembly 218 to have the second plurality of periodic passbands by controlling the dynamic optical filter 500 to have the second plurality of periodic passbands.

At 612, a second output of the filter assembly having the second plurality of periodic passbands is transferred to the optical channel performance monitor. For example, in the implementation of FIG. 4, the output of the middle optical filter 402 is coupled to the output 222 through the output optical switch 406 under the control of the controller 220. In the implementation of FIG. 5, the output of the dynamic optical filter 500 is directly connected to the output 222.

Next, two example use-cases of the implementation of FIG. 4 will be described. For both examples, the filters 402 are Fabry-Perot filters with the following parameters. The mirror reflectivity is 95%, the mirror spacing=0.02 mm, the cavity material is fused silica, and the clear aperture is 2.5 mm. The tolerances are a mirror tilt error of 0.1 arcsec, a surface irregularity of 0.01 nm, and a loss coefficient of 10 ppm. The filters provide a net finesse of 48.6, a peak transmission of 79%, a free spectral range of 37.51 nm, a bandwidth=0.77 nm, and a tuning rate of −1.266.21 MHz/° C.

In the first example, the application of interest is using the C-band, which is 35 nm wide, and the OCPM 200 has a resolution of 5 nm. The number of channels that can be monitored by the OCPM 200 without the device 202 is 35 nm/5 nm=7. In other words, the OCPM 200 has a resolution equivalent to 7 detectors 210. Because the Fabry-Perot filters used as the filters 402 in this example, each has a 0.77 nm bandwidth, then the number of channels that can be monitored is 35 nm/0.77 nm=45. Because the spacing between the transmission peaks (known as the free spectral range) is 37.51 nm, which is about the width of the c-band (35 nm), one optical filter 402 will be required for ever channel. Thus, in this example, the number of filters 402 in the bank of filters 400 will also be 45. In this configuration the number of channels that can be monitored is vastly increased, but it does not leverage the periodicity of the Fabry-Perot filters. In other words, in this example, one optical filter 402 is added for every channel in the optical signal 107.

In the second example, the application of interest is using a continuum of bands O, E, S, C, L, and U-band, which is 415 nm wide, and the OCPM 200 has a resolution of 5 nm. The number of channels that can be monitored without the device 202 is 415 nm/5 nm=83. Using a bank of the Fabry-Perot filters as the bank of filters 400, with each filter 402 having a 0.77 nm bandwidth, then the number of channels that can be monitored is 415 nm/0.77 nm=539.

Because the spacing between the transmission peaks (known as the free spectral range) is 37.51 nm, which is about 1/11 of the continuum of the bands O through U, one filter will be required for every 11 channels. The number of filters 402 in the bank of filters 400 will only need to be 415 nm/37.51 nm=11. Thus, this configuration vastly increases the number of channels that can be monitored, but it also leverages the periodicity of the Fabry-Perot filters such that only one optical filter 402 is needed for every 11 channels.

Example technical effects of the methods, systems, and apparatus described herein include at least one of: (a) increasing the number of channels in an optical signal that can be monitored by an OCPM; (b) increasing the resolution of an OCPM; (c) allowing the use of lower resolution OCPMs to monitor a given number of channels of an optical signal; and (d) allowing less expensive OCPMs to be used.

The systems and methods described herein are not limited to the specific examples described herein, but rather, components of the systems and/or steps of the methods may be utilized independently and separately from other components and/or steps described herein.

As used herein, an element or step recited in the singular and proceeded with the word "a" or "an" should be understood as not excluding plural elements or steps unless such exclusion is explicitly recited. Furthermore, references to "one example" of the present disclosure, "an example," or "some examples" are not intended to be interpreted as excluding the existence of additional examples that also incorporate the recited features.

This written description uses examples to disclose various examples, which include the best mode, to enable any person skilled in the art to practice those examples, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A device for increasing a number of optical signal channels detectable by an optical channel performance monitor having M detectors, where M is an integer greater than 1, the device comprising:
    an input to receive an optical signal;
    a filter assembly coupled to the input to receive the optical signal, the filter assembly comprising:
        a plurality of periodic optical filters, each periodic optical filter being a static filter including a plurality of passbands different from each other periodic optical filter; and
        an optical switch coupled between the input and the plurality of periodic optical filters, the optical switch selectively operable to transfer the optical signal to the periodic optical filters;
    a controller connected to the filter assembly, the controller selectively configuring the filter assembly to filter the optical signal in a repeating sequence of periodic passbands, wherein the controller configures the filter assembly to filter the optical signal by controlling the optical switch to couple the optical signal to each periodic optical filter of the plurality of periodic optical filters sequentially; and
    an output to transfer an output of the filter assembly to the optical channel performance monitor.

2. The device of claim 1, wherein each periodic optical filter has M periodic passbands.

3. The device of claim 1, wherein the plurality of periodic optical filters consists of X optical filters, where X is an integer greater than or equal to N/M, where N is an integer greater than M and equal to a number of channels in the optical signal.

4. The device of claim 1, wherein the periodic optical filters are one of a Fabry-Perot filter (Etalon), a Bragg grating filter, a ring resonator, a diffraction grating, or a waveguide grating router.

5. The device of claim 1, wherein the input is configured to receive the optical signal from one of free space or a fluid.

6. The device of claim 1, wherein the input is configured to be coupled to a waveguide and to receive the optical signal from the waveguide.

7. The device of claim 6, wherein the waveguide is an optical fiber.

8. The device of claim 1, wherein the filter assembly comprises at least one waveguide optical filter.

9. The device of claim 1 wherein the filter assembly comprises at least one free space optical filter.

10. The device of claim 1, wherein the filter assembly further comprises an output optical switch coupled between the plurality of periodic optical filters and the output, the optical switch selectively operable to transfer outputs from the periodic optical filters to the output.

11. The device of claim 10, wherein the controller controls the output optical switch in coordination with controlling the optical switch to couple the optical signal to each periodic optical filter of the plurality of periodic optical filters and to couple an output of each periodic optical filter to the output sequentially.

12. An optical channel performance monitoring system comprising:
    an optical channel performance monitor comprising an input and M detectors, where M is an integer greater than 1;
    a device comprising:
        an input to receive an optical signal;
        a filter assembly coupled to the input to receive the optical signal, the filter assembly comprising:
            a plurality of periodic optical filters, each periodic optical filter being a static filter including a plurality of passbands different from each other periodic optical filter; and
            an optical switch coupled between the input and the plurality of periodic optical filters, the optical switch selectively operable to transfer the optical signal to the periodic optical filters;
        a controller connected to the filter assembly, the controller selectively configuring the filter assembly to filter the optical signal in a repeating sequence of periodic passbands, wherein the controller configures the filter assembly to filter the optical signal by controlling the optical switch to couple the optical signal to each periodic optical filter of the plurality of periodic optical filters sequentially; and
        an output coupled to the input of the optical channel performance monitor to transfer an output of the filter assembly to the optical channel performance monitor.

13. The optical channel performance monitoring system of claim 12, wherein each periodic optical filter has M periodic passbands.

14. The optical channel performance monitoring system of claim 12, wherein the plurality of periodic optical filters consists of X optical filters, where X is an integer greater than or equal to N/M, where N is an integer greater than M and equal to a number of channels in the optical signal.

15. The optical channel performance monitoring system of claim 12, wherein the periodic optical filters are one of a Fabry-Perot filter (Etalon), a Bragg grating filter, a ring resonator, a diffraction grating, or a waveguide grating router.

16. The optical channel performance monitoring system of claim 12, wherein the optical channel performance monitoring system is mounted in one of a spacecraft or a satellite.

17. The optical channel performance monitoring system of claim 16, wherein the input of the device is configured to receive the optical signal from free space.

18. The optical channel performance monitoring system of claim 12, wherein the input of the device is configured to be coupled to a waveguide and to receive the optical signal from the waveguide.

19. The optical channel performance monitoring system of claim 18, wherein the waveguide is an optical fiber.

20. The optical channel performance monitoring system of claim 12, wherein the filter assembly comprises at least one waveguide optical filter.

21. The optical channel performance monitoring system of claim 12, wherein the filter assembly comprises at least one free space optical filter.

22. The optical channel performance monitoring system of claim 12, wherein the device's filter assembly further comprises an output optical switch coupled between the plurality of periodic optical filters and the output, the optical switch selectively operable to transfer outputs from the periodic optical filters to the output.

23. The optical channel performance monitoring system of claim 22, wherein the device's controller controls the output optical switch in coordination with controlling the optical switch to couple the optical signal to each periodic optical filter of the plurality of periodic optical filters and to couple an output of each periodic optical filter to the output sequentially.

24. A method of optical channel performance monitoring comprising:
    receiving an optical signal from a channel;
    transferring the optical signal to a filter assembly, the filter assembly comprising:
        a first periodic optical filter having the first plurality of periodic passbands;
        a second periodic optical filter having the second plurality of periodic passbands; and
        an optical switch coupled between an input of the filter assembly and the first and second periodic optical filters, the optical switch selectively operable to transfer the optical signal to the first periodic optical filter and the second periodic optical filter;
    configuring the filter assembly to have a first plurality of periodic passbands by operating the optical switch to transfer the optical signal to the first periodic optical filter;
    transferring a first output of the filter assembly having the first plurality of periodic passbands to an optical channel performance monitor;
    configuring the filter assembly to have a second plurality of periodic passbands different than the first plurality of periodic passbands by operating the optical switch to transfer the optical signal to the second periodic optical filter; and
    transferring a second output of the filter assembly having the second plurality of periodic passbands to the optical channel performance monitor.

25. The method of claim 24, wherein:
    the optical channel performance monitor includes M detectors, where M is an integer larger than 1;
    receiving the optical signal from the channel comprises receiving the optical signal including N channels, where N is a positive integer larger than M;
    transferring the optical signal to the first periodic optical filter comprises transferring the optical signal to the first periodic optical filter consisting of M periodic passbands as the first plurality of periodic passbands; and
    transferring the optical signal to the second periodic optical filter comprises having transferring the optical signal to the second periodic optical filter consisting of M periodic passbands as the second plurality of periodic passbands.

26. The method of claim 24, further comprising:
    sequentially transferring the optical signal to a plurality of additional periodic optical filters, each additional periodic optical filter including a plurality of periodic passbands; and
    transferring outputs from the plurality of additional periodic optical filters to the optical channel performance monitor, wherein each additional periodic optical filter has a plurality of periodic passbands different than the first plurality of periodic passbands, the second plurality of periodic passbands, and each other additional periodic optical filter's plurality of periodic passbands.

27. The method of claim 24, wherein transferring the optical signal to the first periodic optical filter comprises transferring the optical signal to one of a Fabry-Perot filter (Etalon), a Bragg grating filter, a ring resonator, a diffraction grating, or a waveguide grating router.

28. The method of claim 24, wherein the filter assembly further comprises an output optical switch coupled between the plurality of periodic optical filters and the output, and transferring the first output of the filter assembly having the first plurality of periodic passbands to the optical channel performance monitor comprises operating the output optical switch to couple an output of the first periodic optical filter to the optical channel performance monitor.

29. The method of claim 28, wherein transferring the second output of the filter assembly having the second plurality of periodic passbands to the optical channel performance monitor comprises operating the output optical switch to couple an output of the second periodic optical filter to the optical channel performance monitor.

* * * * *